March 8, 1966 F. B. BURNS 3,238,917
APPARATUS FOR PREPARING SHEET MATERIAL
IMPREGNATED WITH A SATURANT
Original Filed Feb. 11, 1957 3 Sheets-Sheet 3
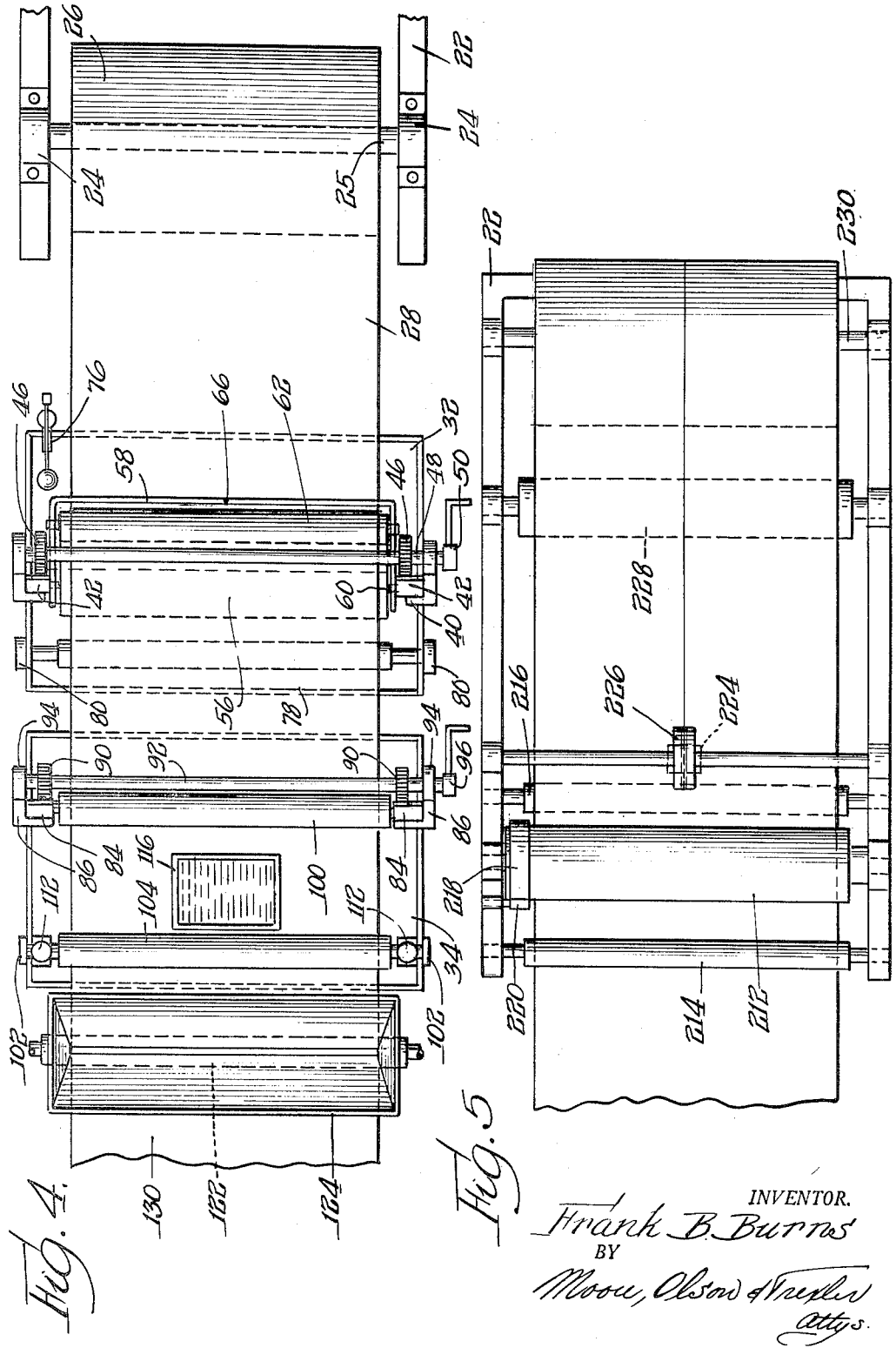
INVENTOR.
Frank B. Burns
BY
Moore, Olson & Trexler
attys.

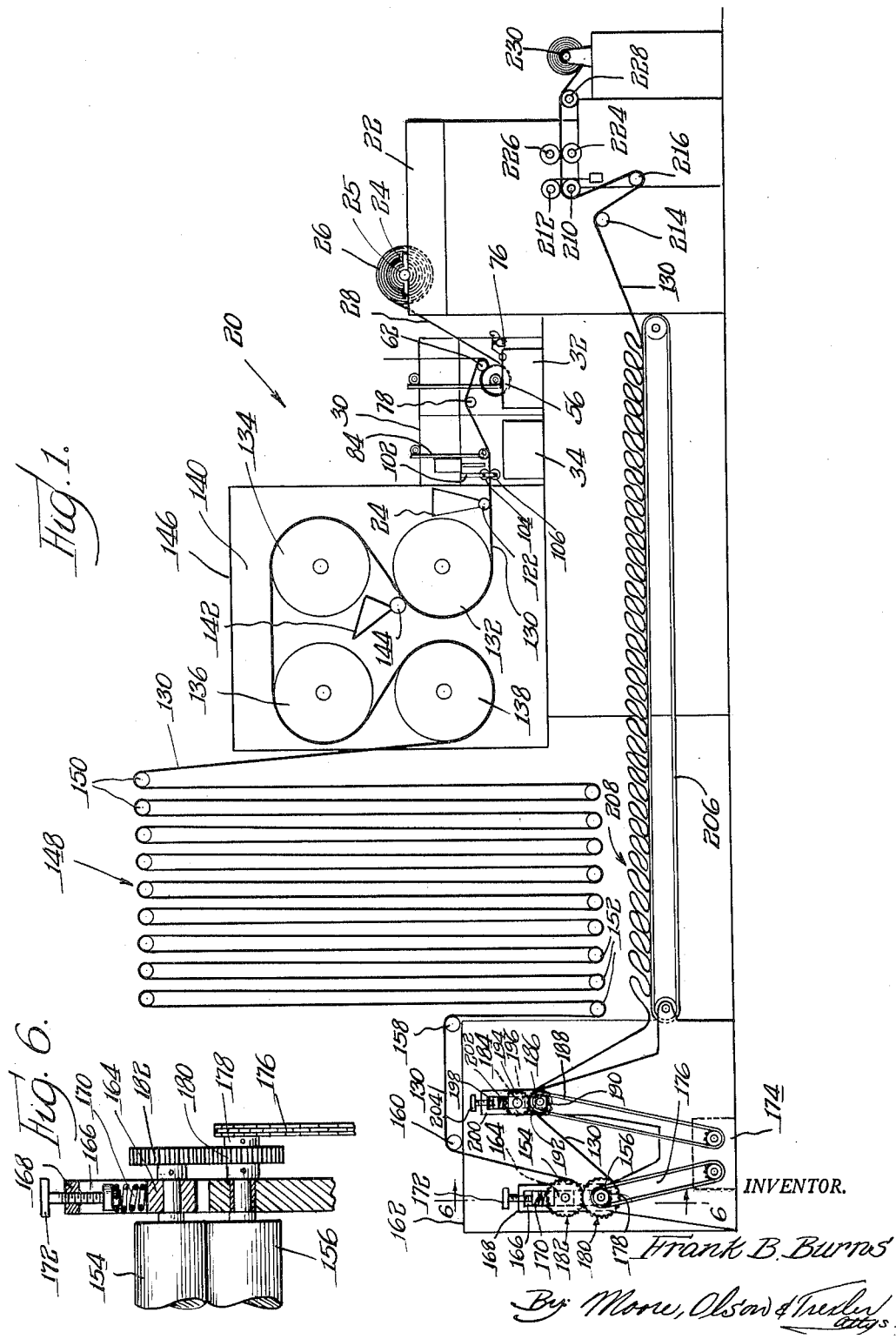

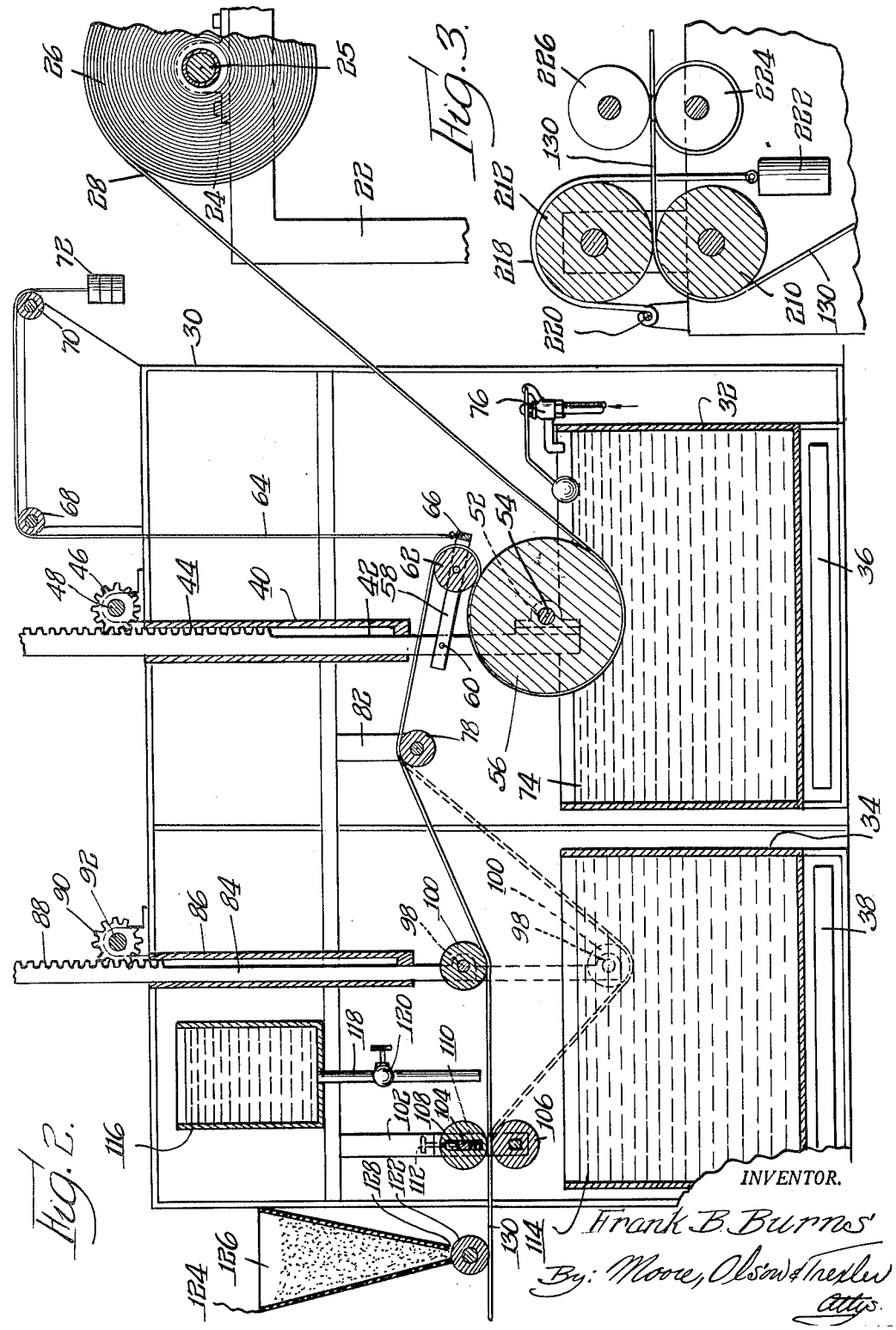

United States Patent Office 3,238,917
Patented Mar. 8, 1966

3,238,917
APPARATUS FOR PREPARING SHEET MATERIAL IMPREGNATED WITH A SATURANT
Frank B. Burns, Wynnewood, Okla., assignor to Kerr-McGee Oil Industries, Inc., a corporation of Delaware
Original application Feb. 11, 1957, Ser. No. 639,584. Divided and this application Feb. 26, 1962, Ser. No. 175,895
7 Claims. (Cl. 118—33)

This application is a division of my copending application Serial No. 639,584, filed February 11, 1957, for "Bituminous Coated Article and Method of Making Same," now abandoned, which in turn, is a continuation-in-part of my application Serial No. 232,544, filed June 20, 1951, now abandoned.

This invention relates to apparatus for preparing sheet material impregnated with a saturant, preferably bituminous in nature, and more particularly, it relates to apparatus for preparing sheet materials comprising a base sheet of synthetic mineral wool fibers, preferably glass, which are coated or saturated with a bituminous composition, the preferred bituminous material being asphalt.

Synthetic mineral wool fiber mats or felts lack many of the inherent undesirable characteristics of an asbestos felt base in that they have very high uniform tensile strengths, are not subject to wicking, have very low moisture pick-up and other advantageous properties including all those of the asbestos felt bases. Attempts to substitute the glass fiber mats for the asbestos felts have not heretofore produced satisfactory sheet materials, however, when prior art apparatus was used in a saturation step with bituminous material. For example, application to glass fiber mat material of the asphalt composition usually applied to asbestos felts in making pipeline felts produces an inferior and unsatisfactory product when using the prior art apparatus for the saturation step as the uniformity of the product cannot be controlled at an acceptable level.

It is an object of this invention to provide an improved apparatus for preparing sheet material impregnated with a saturant.

A further object is to provide improved apparatus for making a bituminous sheet material having a synthetic mineral wool fiber sheet base.

Still another object is to provide improved apparatus for making bituminous sheet material having a synthetic mineral wool fiber sheet base in a continuous strip.

Still another object is to provide an improved apparatus for making bituminous sheet material having a synthetic mineral wool fiber sheet base and a porosity which permits full release of gases trapped when said sheet is wrapped on a pipe but retains the pipeline enamel employed therewith.

Still another object is to provide an improved apparatus for making bituminous sheet material having a synthetic mineral wool fiber sheet base saturated and subsequently coated with a different bituminous material.

Other objects will appear hereinafter.

It has been found that the foregoing objects are accomplished by the apparatus to be described and which, so so far as its nature admits, is illustrated in the accompanying drawings which form a part of this specification and in which:

FIGURE 1 is a somewhat diagrammatic view in elevation of an apparatus for making a bituminous sheet material embodying the features of the present invention;

FIGURE 2 is an enlarged detailed view partly in vertical cross-section along the longitudinal center of the apparatus illustrated in FIGURE 1, showing a portion of the apparatus illustrated in greater detail;

FIGURE 3 is an enlarged detailed view of the slitting mechanism;

FIGURE 4 is a plan view of the portion of the apparatus shown in FIGURE 2;

FIGURE 5 is a plan view of the slitting mechanism shown in FIGURE 3 and of the reel for winding the finished material; and FIGURE 6 is an enlarged detailed view, partly in cross-section on the line 6—6 in FIGURE 1.

The drawings in FIGURES 1, 2, 3, 4 and 5 illustrate a preferred apparatus for forming bituminous sheet materials in accordance with the present invention. This apparatus designated generally 20 comprises a base or platform 22 carrying bearings 24 in which a roll 25 is mounted for rotation. The roll 25 supports a supply roll 26 of glass fiber mat material or other fibrous sheet material. This roll form is the preferred method of packaging glass fiber mat material, although it is within the scope of the invention to handle it in other forms if desired. Immediately to the left of the roll support 22 as shown in FIGURES 1, 2 and 4 is the portion of the apparatus in which the bituminous material is applied to the glass fiber mat which is designated 28. The bituminous material applying apparatus includes suitable supporting framework designated generally 30 supporting a pair of tanks 32 and 34 which may be jacketed if desired, to prevent heat loss. Each tank is provided with suitable heating means such as the heaters 36 and 38 shown in FIGURE 2. Mounted above the tank 32 for vertical sliding movement in guides 40 are a pair of vertically extending bearing support members 42. Each of the vertical bearing support members 42 is provided on its upper end with a rack 44 which engages a pinion 46. As seen in FIGURE 4, the two pinions 46 are mounted near the opposite ends of the shaft 48 which is rotatably supported on the upper portion of the framework. Pinions 46 are fixed to the shaft 48 and can be turned simultaneously by means of a handle 50 secured on the end of the shaft. Thus, by rotating the handle 50, the two bearing supports 42 can be raised or lowered simultaneously.

The bearing supports 42 carry on their lower ends pillow blocks 52 which rotatably support the shaft 54 of a drum 56 which serves as a dip roll. It is apparent that by raising or lowering the uprights 42 with the aid of the rack and pinion structure above described, the dip roll 56 can be lifted out of the tank 32 or submerged therein to any desired depth. Just above the dip roll 56 a U-shaped frame member 58 is pivotally supported at its opposite ends as at 60 on the same uprights 42 which carry the dip roll. The frame member 58 in turn rotatably supports a doctor roll 62 in opposed relation to the dip roll 56. As seen in FIGURE 2, a rope or cable 64 secured preferably to the central portion of the U-shaped frame member 58 as at 66 extends upwardly over guide pulleys 68 and 70 which may be mounted on the framework 30 but preferably are supported from the ceiling by means not shown. The free opposite end of the cable 64 is provided with means to receive removable weights 72. The weights 72 serve as a counterbalance against the weight of the roll 62 and by varying the weights 72 any desired pressure between the roll 62 and the roll 56 can be provided.

Preferably asphalt material is continuously supplied to the tank 32 to maintain a body of molten asphalt therein 74 up to the level indicated in FIGURE 2. The asphalt is preferably supplied from a source not shown through the float valve 76 which aids in maintaining the level constant and thereby assures that with the dip roll 56 in a given position, substantially a uniform coating of asphalt will be applied to the glass fiber sheet.

As best seen in FIGURE 2, a continuous strip of glass fiber sheet material 28 such as the glass fiber mat above described, is directed from the roll 26 down into the body of asphalt 74 in tank 32 underneath dip roll 56 and around the dip roll and between dip roll 56 and the doctor roll 62, thence up around the doctor roll 62 from which it is drawn off toward the left, over a non-rotatable guide roll 78 supported at its opposite ends, as at 80, in the depending frame members 82. It will be observed that the guide roll 78 is so positioned that the glass fiber sheet is drawn off the roll 62 in a plane parallel with the plane through the axis of the doctor rolls 62 and the axis upon which the frame member 58 pivots. This arrangement is preferred because it has the advantage that it eliminates any tendency for variations in the tension on the sheet 28 to cause the frame member 58 to pivot on the axis 60 and thus change the pressure between the roll 62 and the roll 56. The roll 78 is preferably provided with suitable heating means such as a steam packet not shown, so as to maintain the surface of roll 78 at a sufficiently high temperature to prevent sticking of the treated sheet. The synthetic mineral wool fiber sheet threading arrangement described in this paragraph will hereinafter be called the "normal threading arrangement."

Referring now to the tank 34, it will be noted that above it also there are a pair of vertical racks or bearing supports 84 mounted in a pair of guides 86 to slide vertically. Each of the supports 84 is formed with a rack 88 on its upper end which engages a pinion 90, which pinions are secured near the opposite ends of a rotatable shaft 92 mounted in bearings 94 carried by the frame 30. Shaft 92 like the shaft 48 has a handle 96 secured on its projecting end which permits the two pinions 90 to be rotated simultaneously, thereby simultaneously raising or lowering the two bearing supports 84. The bearing supports 84 at their lower ends have bearings 98 secured thereon in which the opposite ends of a rotatable dip roll 100 are journaled. It might be added at this point that sometimes it is desirable to have the dip roll 1 stationary rather than rotatable.

Also above tank 34 adjacent the left hand side thereof as viewed in FIGURE 2, are a pair of fixed depending roll supports 102 carried by the frame 30. These supports 102 carry on their lower ends a pair of non-rotatable doctor rolls 104 and 106. Both doctor rolls are preferably heated by any suitable means since it has been found that doctor rolls heated to a temperature above the temperature of the asphalt in the tank 34 produce a better product. The upper roll 104 is adjustable with respect to the roll 106 in order to permit the thickness of the finished sheet to be varied. To this end, a verically extending slot 108 is provided in each support 102 and the reduced and squared ends of the roll 104 extend into the slots 108. These ends rest on springs 110 compressed between the bottom portions of the slot 108 and the squared end of the roll 104. It is apparent that by turning the adjustable member 112, the roll 104 can be raised or lowered to provide any desired spacing between the rolls 104 and 106.

During the coating operation, a body of molten asphalt material 114 is maintained in the tank 34 preferably up to the level indicated in FIGURE 2. Additional asphalt material is supplied to the tank 34 from the supply tank 116 supported on the frame 30 above tank 34 as illustrated in FIGURE 2. Asphalt from the supply tank 116 is supplied to the tank 34 through the outlet 118 extending from the bottom of the tank 116 under control of the valve 120. As best seen in FIGURE 4, the tank 116 is centrally located over the glass fiber sheet 28 and intermediate the dip roll 100 and the doctor rolls 104 and 106 so that the asphalt from tank 116 is directed through the outlet 118 onto the upper surface of the glass fiber web exending from the dip roll 100 up to the doctor rolls 104 and 106. This assures that an excess of the asphalt coating material is provided on the top surface of the sheet.

FIGURE 2 illustrates in solid and dotted lines the two courses the glass fiber sheet can take with respect to the tank 34. To making pipe wrap which is given a single application of bituminous material in the tank 32, the glass fiber web is directed from the guide roll 78 as shown in solid lines in FIGURE 2 and between the doctor rolls 104 and 106 which are open sufficiently to provide ample clearance for the sheet or web passing through. It will be seen that for this operation, the dip roll 100 is elevated to the position shown in solid lines in FIGURE 2 which is well above the tank 34.

When the canal liner or roofing material or other asphalt sheet material treated with two different asphalt materials is to be made, the dip roll 100 is lowered to a position such as that indicated in dotted lines in FIGURE 2 and the web is directed into the body of asphalt below the dip roll 100 and thence up between the doctor rolls 104 and 106 as indicated in dotted lines. It will be apparent, of course, that the dip roll 100 may be lowered to any desired depth in the tank 34. As indicated above, the asphalt supplied to the tank 34 is directed onto the top surface of the sheet or web and in this manner, the sheet or web, when it arrives at the doctor rolls 104 and 106 has thereon an excess of the asphalt composition from the tank 34. The doctor roll 104 is positioned so as to give the desired sheet thickness, it being adjustable as explained above.

Whatever type of asphalt sheet material is being made, the sheet after passing the doctor rolls 104 and 106 is drawn past the roll 122 rotatably mounted on the bottom of dust box 124 suitably supported on frame 30. A supply of non-sticking dusting material such as mica or colored granules 126 is provided in the box 124 and as the roll 122 rotates, this material carried by the roll 122 through the slot 128 is sprinkled on the upper surface of the asphalt coated sheet 130 passing beneath the roll 122 but not in contact therewith. The dust box 124 may be of any desired form but preferably is V-shaped in vertical cross-section as illsutrated and extends the full width of the sheet as does the roll 122 as illustrated in FIGURE 4. Roll 122, as is roll 144, is fluted and spaced a sufficient distance above the sheet 130 to avoid sticking of the roll and thereby provide proper distribution of the surfacing material upon the sheet. Also, these rolls, 122 and 144, are independently driven but their speed is synchronized with that of roll 132.

Referring now to FIGURE 1, it will be seen that to the left of the dusting box 124, there is a group of four large cooling drums 132, 134, 136 and 138. These drums are rotatably supported at their opposite ends on suitable framework 140 and are longer axially than the width of any glass fiber sheet to be processed. These cooling drums are preferably of the same size and synchronously driven by means of a variable speed means. Supported above and slightly to the left of the drum 132 on framework 140 is a second dusting box 142 provided with a rotatable roll 144 and otherwise generally similar in construction and operation to the box 124. This box also contains a body of dusting material such as mica or granules which is sprinkled on the sheet 130 as it passes beneath roll 144 and over the drum 132. Preferably, the four rolls 132, 134, 136 and 138 and the dusting boxes 124 and 142 are all enclosed in a suitable housing, such as 146, to confine the dusting material as much as possible.

The sheet 130, as shown, after being drawn past the dusting roll 122 is directed under the drum 132, then up around the inside of this cooling drum 132 between it and the roll 144 where a layer of dusting material is applied to the face of the sheet 130 opposite to that dusted by the roll 122, after which the sheet passes from the cooling drum 132 up and around the outside of the cooling drum 134, thence up from the top of the drum 134 over to the top of the third cooling drum 136 around the outside of this cooling drum 136 down between the cooling drum 136 and the cooling drum 138 to the inside of the drum 138 and thence around this drum to the outside thereof and on upwardly as will be further described.

To further cool the sheet 130, this sheet after leaving the drum 138 enters a festooning arrangement designated generally 148. This festooning arrangement 148 comprises a series of upper rolls 150 and a cooperating series of lower rolls 152 staggered between the upper rolls 150. As may be seen in FIGURE 1, this sheet 130 is directed over the upper and lower rolls 150 and 152 in the usual manner. From the last roll 152, the sheet 130 is directed to a pair of pull rolls 154 and 156, preferably after passing over a pair of guide rolls 158 and 160 supported on suitable framework.

Pull rolls 154 and 156 are likewise supported on this framework 162, roll 156 being supported on fixed bearings and roll 154 being adjustable. Thus, the bearings 164 for the roll 154 are slidable vertically in slots 166 formed in the bearing supports 168. Springs 170 extend in the slots 168 between the bearing 164 and clamping members 172 threaded through the upper portion of this support 168. As is apparent, the clamping members 172 may be turned down to compress the springs 170 to provide any desired amount of pressure between the rolls 154 and 156. The rolls 154 and 156 are driven by a suitable source of power 174 through a chain drive 176 which engages a sprocket 178 secured to roll 156, roll 154 being driven by a pair of cooperating gears 180 and 182 secured respectively to the rolls 156 and 154. Thus, by means of these driven rolls 154 and 156 tightly clamping the sheet 130, the sheet is pulled through the entire apparatus from the last cooling drum 138.

After the sheet has been pulled through the pull rolls 154 and 156 as illustrated in FIGURE 1, it passes under roll 156 and up and over to a pair of rolls 184 and 186, also rotatably supported on the framework 162. These rolls are also driven from the source of power 174 by suitable means such as the chain drive 188 engaging sprocket 190 fixed to roll 186. Roll 184 is in turn driven from roll 186 by cooperating gears 192 and 194 fixed respectively to rolls 186 and 184. The roll 186 like the roll 156 is provided with fixed bearings and the roll 184 like the roll 154 is adjustable to vary the pressure between rolls 184 and 186. To this end, the bearings of roll 184 are slidable vertically in slots 189 provided in the bearing supports 200. Springs 202 extending in these slots 198 are compressed between the bearings 196 and threaded clamping members 204 which are threaded through the tops of supports 200. Clamping members 204 are adjusted so that the rolls 184 and 186 exert a slight pull on sheet 130 but still permit some slippage, whereby the rolls 184 and 186 serve simply to feed the sheet 130 after it has passed the rolls 154 and 156 onto the endless belt 206 driven by suitable means, not shown, in the direction indicated by the arrows in FIGURE 1. The speed of the endless belt is predetermined to be sufficiently less than that of the sheet 130 so that as the sheet 130 is fed onto the belt 206, it is folded thereon into a series of large rough folds as indicated at 208. These large folds 208 provide a temporary storage for the finished sheet permitting intermittent reeling of the finished sheet as will be described.

From the endless belt 206, the sheet 130 is directed to a pair of braking rolls 210 and 212 rotatably supported on the framework 22. Preferably in passing from the belt 206 to the rolls 210 and 212, the sheet 130 is directed over a stationary guide roll 214 and around rotatable roll 216 which is supported on the framework 22. In many instances, it is desirable to slit the finished sheet 130 longitudinally and the braking rolls 210 and 212 and guide rolls 214 and 216 aid in providing a proper tension on the sheet 130 to facilitate the slitting operation. Suitable braking means are preferably provided in connection with the rolls 210 and 212 such as that illustrated in detail in FIGURES 3 and 5, including a leather strap 218 secured to the framework 22 at one end as illustrated at 220 and suspended over the roll 212 and provided with a suitable weight 222, whereby a drag is provided on the roll 212 to maintain any desired degree of tension on the sheet 130.

The sheet 130 may be slit in any desired number of widths. For purposes of illustration, the slitting of the sheet into two equal parts is shown. To this end, a slitting wheel 224 is rotatably supported on frame 22 in position to engage the sheet 130 just after it passes between rolls 210 and 212. Cooperating with the slitting wheel 224 is a roll 226 also rotatably supported on the framework 22 in position to press the sheet 130 against the slitting wheel 224 to ensure that it will be cut through properly. After passing the slitting wheel 224, the sheet is directed over a guide roll 228, also rotatably supported on the frame 22 and directed onto reel 230 on which it can be wound in any desired lengths. The reel 230 is driven in the usual manner by any desired means, not shown, and pulls the sheet from the belt 206 through slitting mechanism. When the desired length of the sheet has been wound on the reel 230, the sheet is cut laterally and the lengths are removed from the roll 230 after which the free ends of the sheet are secured to the reel 230 to wind new lengths thereon. The reel 230 is driven at a rate of speed higher than that at which the sheet 130 passes through the remainder of the apparatus and thus, will pull a number of the folds 208 from the belt 206 on which the sheet is stored to facilitate the slitting and reeling operation.

The operation of the above described apparatus is largely apparent from the foregoing description. In order to further illustrate the invention, however, the making of pipe wrap and also the making of a canal liner sheet in accordance with the preferred procedure will be described. In the making of pipe wrap, the glass fiber sheet from the supply roll 26 is directed into the tank 32 passing under the dip roll 56, then around between the dip roll 56 and the doctor roll 62. A body of molten asphalt material is maintained in the tank 32 being supplied thereto continuously through the float valve 76.

In the manufacture of pipe wrap particularly, as suggested above, two factors have been found to be important in connection with the doctoring off of the excess saturant applied in tank 32. In the first place, constant pressure between the roll 62 and roll 56 is important to form the best product and to this end, it is important that the sheet passing from the roll 62 to the roll 78 extend in a plane approximately parallel to a plane through the axis of the roll 62 and the axis upon which the frame 58 is pivoted. This minimizes any tendency for a variation in tension to cause the pressure between the roll 62 and roll 56 to vary. It will be apparent that if the guide roll 78, for example, is so positioned that the plane of the glass fiber sheet leaving the roll 62 extends upwardly at an angle with respect to arm 58, an increase in the tension will tend to lift the roll 62, thus decreasing the pressure between it and roll 56 and a decrease in the tension will have the opposite effect.

A second factor which is of importance is the speed of the rolls 56 and 62. In the apparatus illustrated, these are made freely rotatable and the asphalt sheet is carried around them in such a way as to ensure that the peripheral speed of the two rolls will be substantially the lengthwise speed of the glass fiber sheet at all times. It has been found that this aids materially in providing the desired porosity in the pipe wrap which is described above, that is, a porosity such that it permits gases trapped in the wrapping operation to escape but still retains the pipeline enamel.

The maintenance of a substantially constant hydrostatic head in the tank 32 with the aid of float valve 76 also contributes to uniformity in the product. In accordance with the preferred method of operation, only the oxidized asphalt is supplied through the float valve 76 and when tar or pipeline enamel is to be included in the saturant, this tar is metered directly into the tank 32 in proportion to the lineal speed of the glass fiber sheet and is mixed in the tank with the oxidized asphalt.

Changing the speed at which the glass fiber sheet 28 passes through the tank 32 without changing any other condition, affects the amount of asphalt applied to the sheet. Thus, increasing the speed, increases the quantity of asphalt applied because the time for heating the sheet is shorter and the hydrostatic pressure of the asphalt on the roll 62 tends to lift it slightly. This latter effect can, of course, be compensated as desired by changing the weights 72.

As explained above, the glass fiber sheet saturated in the tank 32, after it is passed between the dip roll 56 and the doctor roll 62, is directed over the guide roll 78 and past the tank 34 to the first dusting box 124 which preferably contains a quantity of finely divided mica which is continuously dusted on the top surface of the sheet by the roll 122. The asphalt coated sheet passes around the cooling drums as previously described being coated on the other side with mica by the roll 144, then through the festooning arrangement 148 between the pull rolls 154 and 156 and the feed rolls 184 and 186 which feed the sheet onto the endless conveyor 206. In this conveyor, the sheet is taken off as described above and wound on the reel 230 in any desired length being slit into any widths desired as above described.

In the making of a sheet coated with two different asphalt compositions such as canal liner, roofing material and the like, the coating of the glass fiber sheet in tank 32 is conducted essentially as in the making of pipe wrap. The same oxidized asphalt is preferred as the saturant in this tank, although preferably the pressure exerted by the roll 62 is controlled to be just great enough to ensure that none of the asphalt material applied in tank 32 exudes from the glass fiber sheet when it is dipped in the asphalt composition in the tank 34.

A body of filled asphalt composition is maintained in the tank 34 preferably to a predetermined level and as indicated above, the dip roll 100 is lowered into this tank to a suitable depth such as that indicated in FIGURE 2 to cause the sheet to receive the coating of the asphalt material in tank 34. It has been found that the dipping of the sheet causes an excess of the coating material to be carried up out of the tank on the underside of the sheet but it has been found to be preferable to supply the coating composition to the tank 34 by directing it onto the top surface of the sheet after the sheet has been lifted out of the asphalt in the tank 34 in order to assure that the top surface of the sheet will also have an excess of the coating material thereon. One method of doing this is described above in connection with FIGURE 2. The supply of the coating composition onto the top surface of the sheet is controlled by the valve 120 in the apparatus illustrated to provide an excess on the sheet and also cause a portion to flow from the sheet into the tank 34 thereby maintaining the coating material in tank 34 at the desired level. The sheet with the excess of the asphalt composition thereon is then pulled between heated stationary doctor rolls 104 and 106 which have previously been set to desired spacing to give the sheet the desired finished product weight. It has been found that best results are obtained if the doctor rolls 104 and 106 are maintained at a temperature somewhat in excess of the temperature of the coating composition in the tank 34, such as approximately 320–450° F. for preferred compositions. The spacing of the doctor rolls, like the constant pressure on roll 62, is preferably controlled by weighing the finished product and adjusting the spacing of rolls 104 and 106 to provide the desired weight.

After passing through the doctor rolls 104 and 106 the course of the canal liner or roofing material or other sheet coated with two different asphalt compositions is the same as that described above for the pipe wrap and need not be repeated.

In the description of FIGURES 3 and 5 above, mention is made of the braking of the sheet by the rolls 210 and 212. It has been found that this braking to provide tension is particularly important when the sheet is being slit. It is also important that the braking action be uniform across the entire width of the sheet so as to apply a uniform tension all across the sheet.

From my disclosure on the preceding pages it is readily apparent that a bituminous saturated synthetic mineral wool fiber sheet or mat having appreciable porosity is very desirable in the preparation of bituminous or resinous coated products, since the pores in the sheet or mat are filled with the coating material to key or tie together the coating material on opposite sides of said sheet. Hence, it is also apparent that a material keyed or tied through the pores of the fibrous sheet or mat offer greater resistance to their separation than where the bond is essentially due to interfacial contact between the coating and the saturated sheet.

It is apparent that many widely different embodiments of this invention may be made without departing from the spirit and scope thereof and, therefore, it is not intended to be limited except as indicated in the appended claims.

What is claimed is:

1. Apparatus for preparing sheet material impregnated with a saturant comprising means for applying the saturant in excess to a sheet base, means for doctoring off excess saturant at constant pressure comprising a roll rotatable on a fixed axis, roll supporting arm means mounted to pivot about a second fixed axis spaced from the first named fixed axis, a floating roll rotatably supported in opposed relation to an upper portion of the peripheral surface of the first named roll on the roll supporting arm means to rotate about an axis spaced from the second fixed axis and parallel to the first named fixed axis and means for passing the sheet base between the rolls to doctor off the excess saturant, the axis of the floating roll being movable relative to the opposed roll about the second fixed axis in response to variations in the thickness of the sheet base and being urged downwardly by gravity to press the sheet base against the surface of the opposed first named roll with constant pressure, and means effective after the sheet base passes from between the rolls for passing the sheet base over and away from the floating roll in a direction generally toward the second fixed axis and parallel to a plane passing through the axis of the floating roll and through the second fixed axis.

2. Apparatus for preparing sheet material impregnated with a saturant comprising means for applying the saturant in excess to a sheet base, means for doctoring off excess saturant at constant pressure comprising a roll rotatable on a fixed axis, roll supporting arm means mounted to pivot about a second fixed axis spaced from the first named fixed axis, a floating roll rotatably supported in opposed relation to an upper portion of the peripheral surface of the first named roll on the roll supporting arm means to rotate about an axis spaced from the second fixed axis and parallel to the first named fixed axis and means for passing the sheet base between the rolls to doctor off the excess saturant, the axis of the floating roll being movable relative to the opposed roll about the second fixed axis in response to variations in the thickness of the sheet base and being urged downwardly by gravity to press the sheet base against the surface of the opposed first named roll with constant pressure, counterweight means modifying the action of gravity on the floating roll and providing a predetermined constant pressure on the sheet base differing from the pressure exerted without the counterweight means, and means effective after the sheet base passes from between the rolls for passing the sheet base over and away from the floating roll in a direction generally toward the second fixed axis and parallel to a plane passing through the axis of the floating roll and through the second fixed axis.

3. The apparatus of claim 2 wherein the first named roll and the floating roll supporting means are carried by an upright supporting member, the upright supporting member being adjustable vertically whereby the relationship between the first named roll and the floating roll remains substantially the same when the said rolls are raised and lowered.

4. Apparatus for preparing sheet material impregnated with bituminous material comprising means for applying molten bituminous material in excess to a synthetic mineral wool fiber sheet base bonded with nonthermoplastic binder, means for doctoring off excess bituminous material at constant pressure comprising a roll rotatable on a fixed axis, roll supporting arm means mounted to pivot about a second fixed axis parallel to the first named fixed axis, a floating roll rotatably supported in opposed relation to an upper portion of the peripheral surface of the first named roll on the roll supporting arm means to rotate about an axis spaced from the second fixed axis and parallel to the first named fixed axis and means for passing the sheet base between the said rolls to doctor off the excess bituminous material, the axis of the floating roll being movable relative to the opposed first named roll about the second fixed axis in response to variations in the thickness of the sheet base and being urged downwardly by gravity to press the sheet base against the surface of the opposed roll with constant pressure, and means effective after the sheet base passes from between the rolls for passing the sheet base over and away from the floating roll in a direction generally toward the second fixed axis and parallel to a plane passing through the axis of the floating roll and through the second fixed axis.

5. Apparatus for preparing sheet material impregnated with a saturant comprising means for continuously applying the saturant in excess to a synthetic mineral wool fiber sheet base bonded with nonthermoplastic binder, means for continuously doctoring off excess saturant at constant pressure comprising a roll rotatable on a fixed axis, roll supporting arm means mounted to pivot about a second fixed axis parallel to the first named fixed axis, a floating roll rotatably supported in opposed relation to an upper portion of the peripheral surface of the first named roll on the roll supporting arm means to rotate about an axis spaced from the second fixed axis and parallel to the first named fixed axis, means for continuously passing the base between the said rolls to doctor off the excess saturant, the axis of the floating roll being movable relative to the opposed first named roll about the second fixed axis in response to variations in the thickness of the sheet base and being urged downwardly by gravity to press the sheet base against the surface of the opposed roll with constant pressure, means effective after the sheet base passes from between the rolls for passing the sheet base over and away from the floating roll in a direction generally toward the second fixed axis and parallel to a plane passing through the axis of the floating roll and through the second fixed axis, means for continuously applying in excess a coating composition differing from the saturant on the saturant-treated sheet base, and means for continuously doctoring off the excess of the differing coating composition.

6. Apparatus for making bituminous sheet material comprising means for continuously applying molten bituminous material in excess to a bonded glass fiber sheet base, means for continuously doctoring off excess bituminous material at constant pressure comprising a roll rotatable on a fixed axis, roll supporting arm means provided to pivot about a second fixed axis parallel to the first named fixed axis, a floating roll rotatably supported in opposed relation to an upper portion of the peripheral surface of the first named roll on the roll supporting arm means to rotate about an axis spaced from the second fixed axis and parallel to the first named fixed axis, means for continuously passing the sheet base between the rolls to doctor off the excess bituminous material, the axis of the floating roll being movable relative to the opposed first named roll about the second fixed axis in response to variations in the thickness of the sheet base and being urged downwardly by gravity to press the sheet base against the surface of the opposed roll with constant pressure, counterweight means modifying the action of gravity on the floating roll and providing a predetermined constant pressure on the sheet base differing from the pressure exerted without the counterweight means, means effective after the sheet base passes from between the rolls for continuously passing the bituminous treated sheet base over and away from the floating roll in a direction generally toward the second fixed axis and parallel to a plane passing through the axis of the floating roll and through the second fixed axis, means for continuously applying in excess a layer of a different molten bituminous material over the bituminous material-treated sheet base, means for continuously doctoring off the excess of the different molten bituminous material, means for applying an antisticking surface material to the surfaces of the sheet base treated with the different bituminous material, means for cooling the resultant sheet base to harden the bituminous material, and means for continuously slitting said cooled sheet base lengthwise including means for applying tension lengthwise of the sheet base which is substantially uniform across the width of the sheet and means for continuously cutting the sheet base while it is under said tension.

7. The apparatus of claim 6 wherein the first named roll and the floating roll supporting means are carried by an upright supporting member, the upright supporting member being adjustable vertically whereby the relationship between the first named roll and the floating roll remains substantially the same when the said rolls are raised and lowered, and the means for applying the different bituminous material includes means for passing the bituminous material-treated sheet base through a molten bath of the different bituminous material and means for applying an additional quantity of the different bituminous material to a surface of the sheet after it is withdrawn from the molten bath and while it is thereabove whereby the sheet is completely saturated and bituminous material is supplied to the molten bath.

References Cited by the Examiner

UNITED STATES PATENTS

| | | | |
|---|---|---|---|
| 351,948 | 11/1886 | Warren | 118—117 X |
| 486,638 | 11/1892 | Gage | 118—419 X |
| 1,412,828 | 4/1922 | Beckman et al. | 117—32 X |
| 1,454,323 | 5/1923 | MacInnes | 118—33 X |
| 1,520,198 | 12/1924 | Merrick | 156—192 |
| 1,588,748 | 6/1926 | Koch | 118—419 X |
| 1,753,027 | 4/1930 | Sakuma | 118—33 |
| 2,105,531 | 1/1938 | Greider et al. | 117—19 |
| 2,246,531 | 6/1941 | Novak | 118—117 |

MORRIS KAPLAN, *Primary Examiner.*

RICHARD D. NEVIUS, CHARLES A. WILLMUTH,
*Examiners.*